(12) United States Patent
Goh et al.

(10) Patent No.: US 6,900,793 B2
(45) Date of Patent: May 31, 2005

(54) HIGH RESOLUTION INPUT DETECTION

(75) Inventors: Chun B. Goh, Redmond, WA (US); Steven N. Bathiche, Redmond, WA (US); Gary M. Rensberger, Redmond, WA (US); Nathan C. Serman, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 350 days.

(21) Appl. No.: 10/261,477

(22) Filed: Sep. 30, 2002

(65) Prior Publication Data

US 2004/0061678 A1 Apr. 1, 2004

(51) Int. Cl.[7] ............................................. G09G 5/08
(52) U.S. Cl. ..................... 345/164; 345/165; 345/166; 345/167; 250/231.16
(58) Field of Search .................................. 345/156–169; 463/37–38; 250/231.16, 231.17, 231.18, 221

(56) References Cited

U.S. PATENT DOCUMENTS

| | | | | |
|---|---|---|---|---|
| 5,473,344 A | * | 12/1995 | Bacon et al. | 345/163 |
| 5,844,814 A | | 12/1998 | Chliwnyj et al. | 364/559 |
| 5,912,661 A | * | 6/1999 | Siddiqui | 345/166 |
| 6,353,429 B1 | * | 3/2002 | Long | 345/158 |
| 6,380,927 B1 | * | 4/2002 | Ostrum et al. | 345/165 |

OTHER PUBLICATIONS

Gibson, Steve. 1991. "Efficient mouse technology remains trapped in hyperbole." Abstract from InfoWorld: 13:38 (Sep.) p31. Available http://asp.nerac.com/caccess/WND-ABSM?SESSION=D7297EF1003DF92B&ndn=016001325900&topic.

Razerzone 2002 "Technology." 3pp. Available http://www.razerzone.com/products/boomslang2000/technology.html.

* cited by examiner

Primary Examiner—Lun-Yi Lao
(74) Attorney, Agent, or Firm—Ronald M. Anderson

(57) ABSTRACT

A method and system for determining the position of a movable member in an electronic input device within a predefined resolution. Two offset signals indicate the position of the movable member. The time required for each signal to cross a threshold level is measured and inverted, revealing an offset sinusoidal relationship. The offset sinusoids may be plotted against each other to reveal an approximate circle of inverse time samples for a cycle. Corresponding inverted minimum and maximum times are used to determine a center reference value for each signal. As a function of the inverted times, a quadrant of the circle is determined. Within a quadrant, a sector most closely corresponding to the position of the movable member is determined from among a plurality of predefined sectors that define the resolution. A number of sectors between position samples of the movable member are accumulated and communicated to a host device.

20 Claims, 9 Drawing Sheets

| OLD QUAD | CURRENT STATE | NEW QUAD | NEW STATE | OUTPUT ON CHANGE |
|---|---|---|---|---|
| 00 | 1 | 01 | 2 | + |
| 01 | 2 | 11 | 3 | + |
| 11 | 3 | 10 | 4 | + |
| 10 | 4 | 00 | 1 | + |
| 00 | 1 | 10 | 4 | − |
| 10 | 4 | 11 | 3 | − |
| 11 | 3 | 01 | 2 | − |
| 01 | 2 | 00 | 1 | − |

HIGH RESOLUTION INPUT DETECTION

FIELD OF THE INVENTION

The present invention generally pertains to a method and apparatus for determining a position of a movable member of an electronic input device, and in particular, concerns determining the position of the movable member to a high resolution, using simple operations.

BACKGROUND OF THE INVENTION

Input devices, such as computer mice, trackballs, sliders, and touch pads, are used to provide user input to a computer program and to control applications and are well known in the art. Such pointing devices typically enable a user to move a cursor on a display screen and are fundamental to programs and operating systems that employ a graphical user interface, such as Microsoft Corporation's WINDOWS™ and Apple Corporation's MACINTOSH™ operating systems. In a typical pointing device, a ball is rotated in the housing of the device, either directly by the user's fingers, or by movement of the device over an underlying surface or pad. Depending upon its direction of rotation, the rotating ball in turn causes one or both of a pair of encoder shafts in the housing to rotate. The encoder shafts rotate about a pair of orthogonal axes, i.e., the "X" and "Y" axes, in response to components of the ball's rotation along those axes. As the encoder shafts rotate, the corresponding encoders produce signals that indicate the device's incremental motion along these orthogonal axes. These signals are processed by a microcontroller or other logic processor in the pointing device, which produces a corresponding stream of digital values indicative of a position of the device relative to the X and Y axes. The displacements are passed to a driver program executing on the computer to which the pointing device is attached. The driver program also receives other input signals from the pointing device, including one or more signals indicative of the state of control buttons on the device. The relative position data and the state of the control buttons are input to a computer program (or the operating system), which processes the information, causing a predefined action to occur. For example, as indicated above, many operating systems move a cursor displayed on a monitor or other display screen in response to the user's movement of the pointing device. The X and/or Y movement of the cursor on the display screen is a function of the motion of the ball (or device) along its respective X and/or Y axes.

In recent years, mouse manufacturers have added a third input axis to their products, commonly known as the "Z" axis. Originally developed by the Microsoft Corporation for use with its WINDOWS™ operating system, this Z-axis control on the mouse has become a popular feature for scrolling pages on a computer screen, zooming a computer display, throttling speed in a computer game, and other activities. The Z-axis control is typically implemented using a detented wheel (the Z-wheel) that is coupled to a rotatable shaft. An encoder monitors rotation of the Z-wheel shaft by a user. Examples of a mouse that has such a wheel are illustrated in Microsoft Corporation's U.S. Pat. No. 5,912,661 entitled "Z-Encoder Mechanism," U.S. Pat. No. 5,473,344 entitled "3-D Cursor Positioning Device," and U.S. Pat. No. 6,353,429 entitled "Detented Optical Encoder."

Such mouse input devices usually monitor wheel movement using linear and/or rotational sensors having variable resistance potentiometers, mechanical quadrature encoders or optical encoders. For a typical optical encoder (prior art), the primary components are shown in FIGS. 1 and 2. These components include a code disk or codewheel 10, an emitter 12, and an integrated detection circuit 14. The codewheel generally comprises a plurality of equally-spaced teeth 16, forming slots 18, which may be fully enclosed. An alternative codewheel may be fabricated using a clear plastic or glass disk imprinted with a radially-spaced pattern of lines, commonly called a "mask." Codewheel 10 is typically fixed to a shaft 56 that rotates when a Z-wheel 58 is turned by a user. Formed in a portion of shaft 56 may be evenly spaced longitudinal slots 54 that can be used to affect a detent mechanism. As shown in FIG. 1, a common detent mechanism employs a leaf spring 50 with a protrusion 52 on one end that applies a bias force against longitudinal slots 54. As the shaft is rotated, the protrusion, acting under the biasing force of the spring, moves in and out of successive slots, which flexes the spring back and forth, thereby creating a detent action. The even spacing of the slots in the shaft results in the user feeling a plurality of evenly spaced detented positions as the user rotates Z-wheel 58.

Emitter 12 typically comprises a light emitting diode (LED) 20, which emits light rays 21 that are collimated into a parallel beam by a lens 22. Integrated detection circuit 14 is disposed opposite the emitter and typically comprises at least two photodetectors 24. Suitable photodetectors include photodiodes and phototransistors. The set of components comprising the emitter and photodetectors used in an optical encoder is commonly referred to as the encoder's "photo-optics."

Codewheel 10 is disposed relative to emitter 12 and integrated detection circuit 14 so that when codewheel 10 is rotated, its slotted or lined portion moves between the emitter and integrated detector circuit. Light beam 21 passing from the emitter to integrated detection circuit 14 is thus interrupted by teeth 16 (or by radial lines imprinted) between the pattern of slots 18 on the codewheel. Any portion of the light beam that is not blocked by teeth 16 (or the lines that are imprinted) is detected by photodetectors 24. The photodetectors typically produce an analog output signal that is proportional to the intensity of the light they detect. In general, the output signal produced by each photodetector as the codewheel is turned at a constant rate is sinusoidal. The photodetectors are arranged in a pattern that is a function of the radius and slot or line density of the codewheel, so as to produce a quadrature output that is well known in the art.

As indicated, each photodetector produces an analog output signal applied respectively to a non-inverting Schmitt trigger 32. Schmitt triggers are used to minimize the effects of extraneous noise in the raw signals provided by the phototransistors. Optionally, other types of comparator circuits can be used in place of the Schmitt triggers. The output signals of the Schmitt triggers are input to a microcontroller, which processes the signals on channels A and B using a duty-cycle control algorithm to generate a digital waveform in quadrature, which is further processed by the microcontroller to determine the incremental motion of the encoder wheel. The output from the microcontroller is then passed through a serial communication link to a computer (e.g., through an RS-232 serial port, a universal serial bus (USB) port, or a PS/2 port). A driver in the operating system (or in an application program) processes the output from the microcontroller to control the display and movement of a cursor on the computer monitor screen in response to the movement of the mouse Z-wheel.

In more detail, FIG. 3 (prior art) illustrates functional blocks of an exemplary prior art system to generate encoder wheel position data, as described in U.S. Pat. No. 6,380,927 B1, the disclosure of the specification and drawings of which are hereby specifically incorporated herein by reference. This system comprises three primary components, including a duty-cycle control block 100, a transition determination block 102, and a Z-wheel learning block 104. The duty-cycle control block includes a capture and process block 106, and a sample lookup table 108. The transition determination block comprises a physical-to-logical lookup 110 and a Z/Quad table 112. The input to this system are raw output signals produced by the pair of Schmitt triggers on respective channels A and B, as discussed above. The system output is in the form of a data packet or packets 114, which contain information concerning a relative displacement of the Z-wheel, along with the state of control buttons on the input device in which the Z-wheel is included.

Duty-cycle control block 100 is used to translate the analog phototransistor/Schmitt trigger signals into respective digital channel inputs ZA and ZB. The output signal from a channel's Schmitt trigger will depend on how much of the path along which the collimated light produced by the LED propagates toward the channel's phototransistor is blocked by a codewheel tooth. As shown in FIG. 4 (prior art), when the codewheel is rotated at a constant rate and the LED is continuously turned on, the voltages that are output by the phototransistors appear as sinusoidal waves 120 and 122, which correspond to the output on channels A and B, respectively. Ideally, the two sinusoidal waves will be 90° out of phase, as shown here. Also ideally, the Schmitt triggers will have a threshold voltage level 124 that is one-half of the peak-to-peak voltage 126 of the sinusoidal waves, such that the outputs of the Schmitt triggers are digital waveforms (square waves) similar to waveforms 128 and 130 shown in FIG. 4.

Unfortunately, it is very unlikely that a given photo-optic set (LED, phototransistors, and Schmitt triggers) will produce the waveforms shown in FIG. 4. In actual devices, the threshold level may not be at the midpoint of the peak-to-peak voltage, the phase angle between channels may not be 90°, the output signals produced by the phototransistors may not be symmetric, etc. To address these and other problems, a scheme called duty-cycle encoding was developed.

In the foregoing discussion of optical encoder principles, it was assumed that the LED and photodetectors were always turned on, which works fine for perfectly matched components, but is not a good assumption in the real world. When manufacturing large quantities of pointing devices, unmatched components will likely be used to minimize costs. However, there are some electronics principles that can be applied to the photodetection circuit of FIG. 2 to enable unmatched photo-optic components to produce quadrature waveforms that approach the ideal configuration shown in FIG. 4. In addition to the following discussion, further details concerning the control and processing of signals generated by photo-optic devices as applied in the duty-cycle encoding are disclosed in U.S. Pat. No. 5,256, 913, the specification and drawings of which are hereby specifically incorporated herein by reference.

One electronics principle that is helpful in this case takes advantage of the behavior of a transistor when it is forced into an "off state" and then suddenly turned on. Although a phototransistor should (ideally) produce an output that corresponds to the level of light it detects, the output of such devices cannot instantaneously slew to a steady state value. The following analogy is used to illustrate this principle.

Consider filling an empty bucket with water from a faucet. With reference to FIG. 5, the level of the height of the water in the bucket will start at 0, indicating that the bucket is empty, and increase over time until the bucket is filled, at which point, the level will reach a peak, and the water will overflow. The steepness of the curve will depend on the flow rate of the water into the bucket from the faucet. If the faucet has a high volume flow, like that used to feed a fire hose, the curve from zero to full will be steep. However, it is not likely that a water source can fill the bucket instantaneously. In addition, the flow rate does not instantly change to a steady state value and will not likely be reduced just as the bucket becomes full.

In an analogous fashion, the phototransistors in FIG. 2 generate a charge of electrons, based on the intensity of light detected by the phototransistors, which flow as an electrical current to the Schmitt triggers. In accord with the preceding analogy, the LED is like the water supply, and the teeth (or slots between the teeth) of the codewheel are like the faucet that controls the rate at which water flows into the bucket. If the emitter light beam passes through the slots between the teeth, the phototransistor charges quickly. Conversely, if a wheel tooth blocks most of the light, the phototransistor charges very slowly. (Note that even if a phototransistor is completely blocked, it will still produce a certain minimum level of current called its "dark" current.) Ideally, the rate at which a phototransistor is charged should be proportional to the amount of the light beam that is blocked by a tooth. Furthermore, it is possible to "drain" the phototransistors (i.e., remove any charge present at their output) by momentarily coupling their outputs to ground, which in the analogy, is equivalent to opening a large drain hole in the bucket. The purpose of coupling the output signals to ground is to make sure the output signals produced by the phototransistors are initialized to a zero-charge (i.e., an empty bucket) condition.

FIG. 6 (prior art) is a graph showing the voltage output by a given LED phototransistor pair versus time for different levels of blockage of light by the teeth of the codewheel. The various curves represent the voltage outputs corresponding to different rotational positions of the codewheel, wherein higher voltage curves 140, 142, 144, and 146 correspond to codewheel positions that only block a smaller portion of the light from being received by the phototransistor, while lower voltage curves 148, 150, and 152 correspond to codewheel positions that block a substantially greater portion of the light. For instance, curve 140 corresponds to a rotational position of the codewheel where none of the light directed toward the phototransistor is blocked by a tooth; in contrast, curve 152 corresponds to a rotational position in which a tooth is blocking almost all of the light directed toward the phototransistor.

In addition to variations in voltage output due to blockage, the voltage output versus time for an unblocked phototransistor will depend on the particular characteristics of each given photo-optic pair (i.e., LED-phototransistor combination), as shown in FIG. 7 (prior art). The amount of time necessary for a given unblocked phototransistor to produce an output voltage level that crosses a threshold voltage $V_{TH}$ will depend on the electrical characteristics of the phototransistor and its corresponding LED, i.e., the higher the sensitivity of the phototransistor (or more light produced by the LED), the less time will be required to cross the threshold. For instance, higher voltage curves 154 and 156 correspond to photo-optic pairs that include a relatively sensitive phototransistor and/or a LED that produces greater light output, while middle voltage curves 158, 160, and 162 correspond to photo-optic pairs with average sensitivity, and lower voltage curves 164 and 166 correspond to photo-optic pairs with relatively low sensitivity.

As discussed above with reference to FIG. 2, the phototransistor output voltage is applied to the input of a non-inverting Schmitt trigger, which has an internal threshold voltage (the same $V_{TH}$ as above) such that the output from the Schmitt trigger is a "1" if the phototransistor voltage exceeds the threshold, and a "0" if the voltage is less than the threshold. Suppose an evaluation of the signal is made at some fixed time T after turning on the LED and draining the phototransistor. Ideally, if a wheel tooth is in the way, the output from the Schmitt trigger will be a 0, and if the wheel is not blocking or blocking very little light reaching the phototransistor, then the output from the Schmitt trigger will be a 1. If the wheel is moving and samples are repeatedly taken for every time interval T, a percentage of 1s versus 0s will be established. If the time T is well chosen, the ratio of 1s to 0s should be about 1:1. This balance of 1s and 0s will provide evenly-spaced quadrature states that are approximately equal in duration. As a result, it is less likely that a state change will be missed due to a short state transition.

The object of duty-cycle encoding is to control the time-sampling of the phototransistor outputs on each channel such that a sequence of quadrature bits (on each channel) are produced having a 50% duty cycle when the wheel is rotated at a constant velocity, reducing the chance of quadrature states being missed. This object can be accomplished by finding a time T in which to sample the output signals for a given set of photo-optics. The time can be determined in part, by measuring the fastest threshold crossing time, called $T_{min}$, which corresponds to the time for the output voltage of a given set of photo-optics in which the phototransistors are completely uncovered to cross the threshold. The time for a half-covered photodetector signal to cross the threshold can then be estimated by doubling the value of $T_{min}$. This concept can then be extended to predict the amount of blockage present during a given sample. For instance, if samples are taken at intervals of $2T_{min}$, the output for a given set of photo-optics will be 1s when the photodetector is less than half covered and 0s when the photodetector is more than half covered, which results in the 50% duty cycle.

In summary, duty-cycle encoding is accomplished by determining and reevaluating $T_{min}$ and taking samples of the outputs produced by the Schmitt triggers after $2T_{min}$ on a continuous basis. This process repeatedly performs the steps of draining the photodetector outputs, releasing them to charge to a voltage level, turning on the LED, and reading the digital outputs produced by the Schmitt triggers after a delay of $2T_{min}$. As a result of implementing this process, a quadrature signal similar to that shown in FIG. 4 is produced by combining the digital waveform outputs produced by the Schmitt triggers.

As might be expected, the waveforms produced by the phototransistor/Schmitt trigger/duty-cycle control algorithm scheme of FIGS. 1 and 2 are not especially accurate and clean. Because only one pair of phototransistors is used, instead of one pair for a tooth position and one pair for a slot position, there is a probability that a logic level change (a transition between a high and low voltage level or vice versa) on a channel might be missed, or that a false logic level change might be indicated. Either of these situations would cause the sensed movement of the encoder wheel to differ from the actual movement of the wheel, and the movement of the Z-wheel would thus be inaccurately reflected in the control action implemented by the computer.

A popular way to overcome this problem comprises a particular state transition scheme shown in FIGS. 8A and 8B (prior art) that was developed in conjunction with detented Z-wheels. This state transition scheme and an enhanced state scheme are fully described in U.S. Pat. No. 6,380,927 B1, the disclosure of which has above specifically been incorporated herein. In general, however, the state transition scheme illustrated by FIGS. 8A and 8B, requires two electrical state changes for each detent position of the codewheel. This scheme reduces the impact of missed state transitions and false signals, but is still susceptible to many problems.

A primary problem is that this scheme is limited to only four (4) states for resolving a mechanical angular displacement and direction of the codewheel from slot to slot. Sampling the Schmitt triggers after a relatively arbitrary delay of $2T_{min}$ provides only discrete data; namely, a 1 if the LED light beam was sufficiently unobstructed to enable the phototransistor voltage to reach the voltage threshold within $2T_{min}$, or a 0 if the LED light beam was sufficiently obstructed by a tooth to prevent the phototransistor voltage from reaching the voltage threshold within $2T_{min}$. Under this scheme, angular displacement resolution is limited to the number of distinguishable teeth and slots arranged around the codewheel. The resolution of angular displacement could be increased by increasing the number of teeth and slots around the same diameter codewheel, and/or by increasing the size of the codewheel. However, the overall size of a manually manipulated input device, such as a mouse, must remain within a limited range for user comfort and control. Correspondingly, the codewheel size must remain limited. Similarly, the number of teeth and slots around the codewheel is limited by the size of the codewheel, the size of the phototransistors, and a minimum distance between the phototransistors needed to distinguish the signal from each phototransistor.

Another approach is to scale the output of the device's microcontroller. For example, a standard mouse driver in Microsoft Corporation's WINDOWS™ operating system multiplies the Z-wheel microcontroller output of a connected mouse by a scale factor of 120, which is referred to as the wheel_scale_multiplier (WSM). The scale factor simply provides a multiplicative increase in the number of codewheel state change counts. Regardless of the value used, the wider range of counts produced by the scale factor provides an artificial way for the operating system or an application program on the host processor to emulate a higher resolution by subdividing, or otherwise modifying a single increment of the codewheel into more than one count. Shifting such scaling to the host processor reduces the processing complexity and the cost of the mouse microcontroller. However, this scaling does not truly increase the number of state change counts per codewheel increment. Thus, this scaling does not truly increase the resolution of the Z-wheel. Also, such individual scaling by the operating system and each application program can cause inconsistent scrolling in multiple windows on the display of a single user. If programs in each window used the scale factor differently, the user would have to adjust to a different scroll rate each time the user changed focus to a different window. Adjusting to, and/or remembering different scroll rates would be distracting. To provide the user with a consistent scroll rate in each window, the operating system and most application programs nullify the scale factor by dividing by 120 before performing a scroll.

As an alternative, the user can control the effect of each increment of the codewheel, which typically corresponds to each detent increment of the Z-wheel. Through a control panel setting, the user may choose to equate one Z-wheel detent increment with scrolling by one full page, or by any number of individual lines (sometimes referred to herein as wheel scroll lines (WSL)). By default, one Z-wheel detent increment is set to scroll three lines. The user can set the WSL to a higher number to scroll more quickly, but the scrolling will be in large disjointed jumps. Alternatively, the user can set the WSL to one or two lines. However, the user would then have to rotate the Z-wheel more times to scroll a large distance. In any case, without some other resolution control, equating a codewheel increment to a number of lines will always result in some jerky motion of the display that is somewhat difficult for the user to visually track. A smooth, higher resolution motion would be preferable, so that the user can easily track the motion visually, yet cover a large distance if necessary without excessive rotation of the Z-wheel or other input device.

Of course, the WSL selection could be modified to allow fractional lines or other very small increments of distance. However, the user would again have to rotate the Z-wheel many times to scroll even a moderate distance. Also, to provide relatively smooth scrolling, the fractional increments would have to be so small that they would loose any meaningful relationship to a user-friendly setting such as the number of lines scrolled per detent increment of the Z-wheel. It is therefore desirable to provide smooth, high resolution control of scrolling (or other functions) with the Z-wheel or other input device, yet maintain a simple relationship between increments of the codewheel and the resulting action.

Smooth scrolling could also be implemented with complex smoothing algorithms that are run on the host computer processor or on a sophisticated processor in the input device. However, burdening the host processor with such input interruptions and additional overhead reduces the overall efficiency of the host computer. Adding a sophisticated processor to the input device drives up the cost of a typically low-cost device. A sophisticated processor in the input device may also require more communication between the input device and the host computer. More communication would likely require higher bandwidth to maintain real-time response to user actions with the input device. Unfortunately, higher bandwidth is expensive and reduces the marketability of such an input device with a sophisticated processor. Thus, it is desirable to improve resolution of an input device without requiring a sophisticated and costly processor in the input device to perform complex calculations, and without artificial scaling and subdividing by the host processor, which would result in a poor relationship to a user-friendly unit of motion.

SUMMARY OF THE INVENTION

The present invention improves the resolution of an electronic input device through finer position detection with simple operations. More specifically, the present invention provides a method and system for determining the position of a movable member in the electronic input device within a predefined resolution. A first signal and a second signal, such as those from a pair of detectors, are offset from each other and indicate the position of the movable member. The time required for each signal to cross a threshold level is measured and inverted. A minimum and maximum time required for each signal to cross the threshold level is also measured and inverted. Preferably, the minimum and maximum values are first set to an initial value and then continually updated as different minimum and maximum values are detected. From the inverted minimum and maximum times, a reference value is determined for each signal. As a function of the inverted times, a sector is then determined from among a plurality of predefined sectors that define the desired resolution.

The sector is preferably determined in multiple stages. Initially, a range of motion of the movable member is divided into physical detection cycles. For example, a codewheel is divided by a set of teeth. Thus, motion is divided into cycles from tooth to tooth. The minimum and maximum values for the signals to cross the threshold are determined over a cycle. For each cycle, a quadrant is determined from among a plurality of predetermined quadrants that divide a single cycle. The quadrant is determined by the relative relationship of the two inverted times to cross the threshold level and the two corresponding reference values. Each quadrant is divided into sectors that define the desired resolution. Boundaries between each sector are defined by simple linear equations. The sector that most accurately represents the current position of the movable member is determined with bit-wise and comparative operations that determine the boundaries that enclose a virtual point that is relative to the two inverted times to cross the threshold level and the two corresponding reference values.

A second position is determined to reflect any motion of the movable member. The sector determined for the second position is compared with the sector determined for the previous position to compute a number of sectors between the second position and the previous position. The number of sectors between multiple positions may be accumulated in a count buffer until a total count is communicated in a message to a host device. The host device can then scale the total count to a user-friendly unit of motion, or otherwise use the total count as desired.

Another aspect of the present invention is a memory medium storing machine instructions that enable a processor to carry out the steps described above, and described in further detail below. A further aspect of the invention is an electronic input device including a movable member, a signal source, and a controller capable of carrying out the steps described above, and described in further detail below. The movable member may be a wheel, a slider, a ball, a joystick or finger stick, a stylus or finger on a pressure pad, or any other member that a user may manipulate to provide input. The signal source produces two offset signals that are indicative of the position of the movable member. The signals are communicated to the controller, which carries out functions to determine the sector representing the position of the movable member. The electronic input device may further include a timer for measuring the times for the signals to cross the threshold level. A buffer may also be included to accumulate and store the total number of sectors passed between position samples. The total number of sectors may be communicated to the host device with a communication module, such as an infrared module, a radio frequency (RF) module, a USB module, a personal computer series 2 (PS/2) module, or other communication module.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 2:
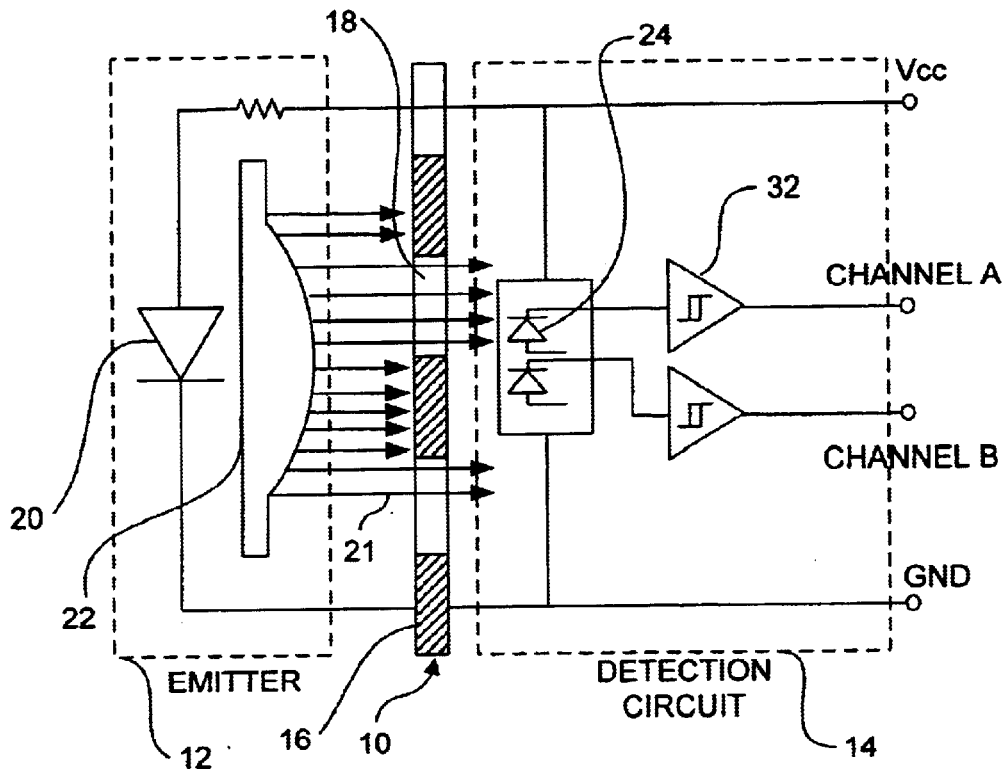
FIG. 2 (prior art) is a schematic diagram illustrating a photo-optic encoder for detecting motion of a codewheel that is rotatably connected to the Z-wheel of the computer mouse.
Figure 3:
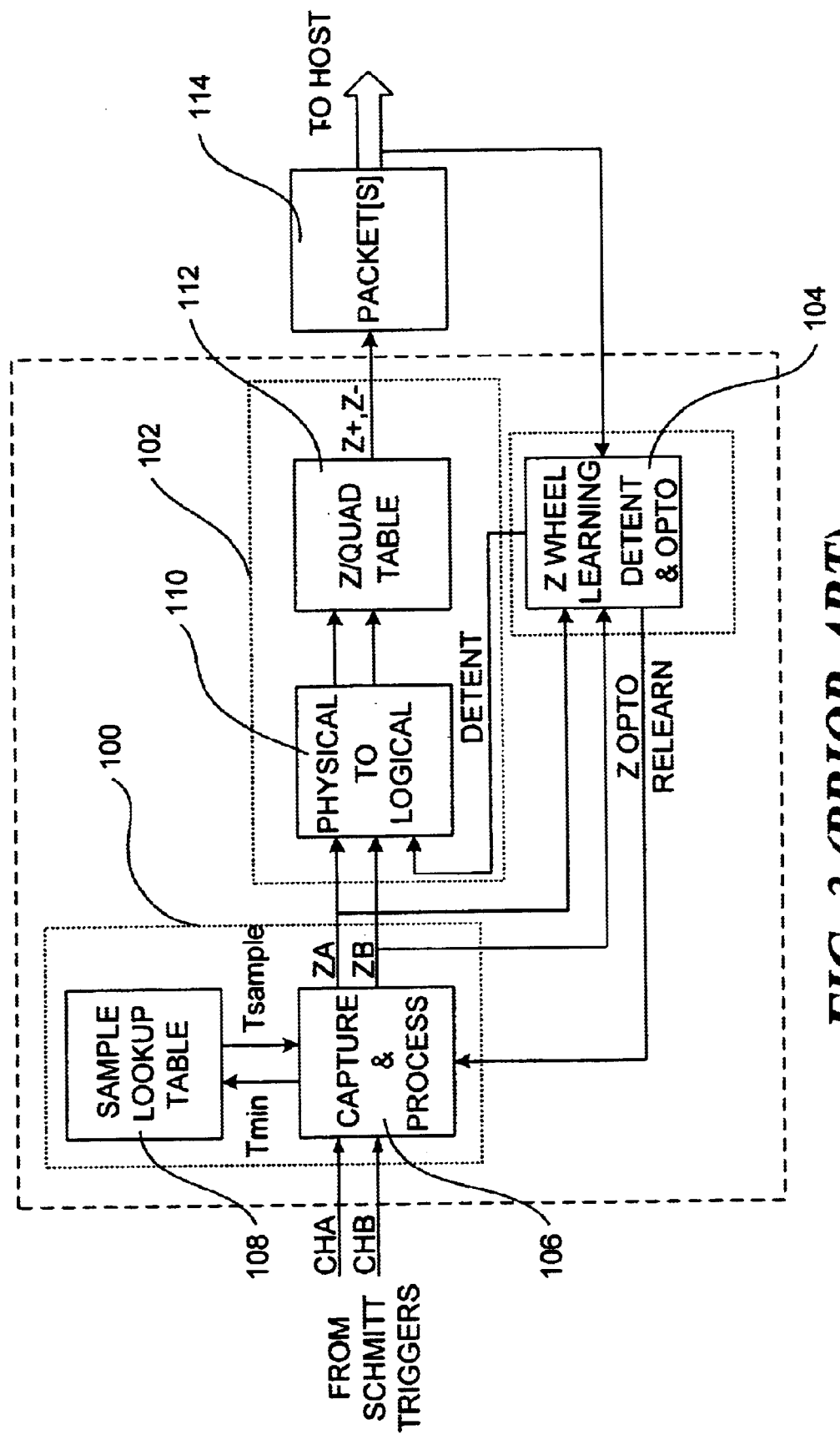
Figure 4:
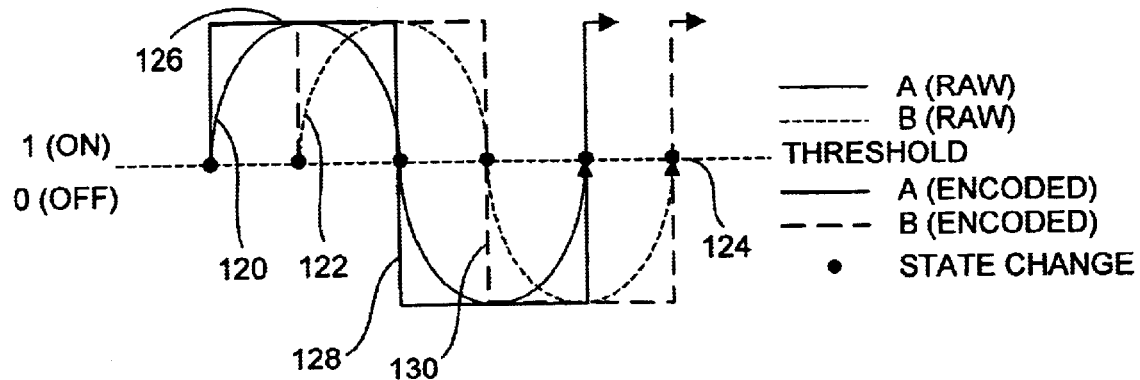
Figure 5:
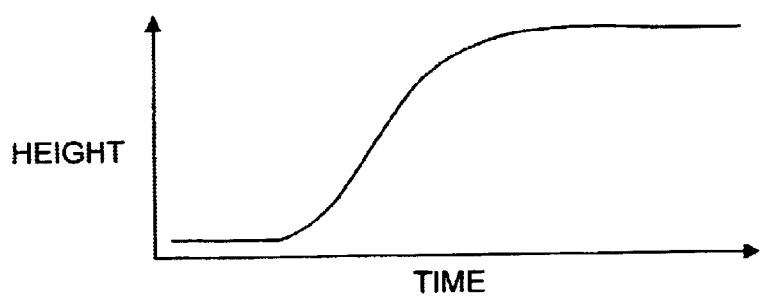
Figure 6:
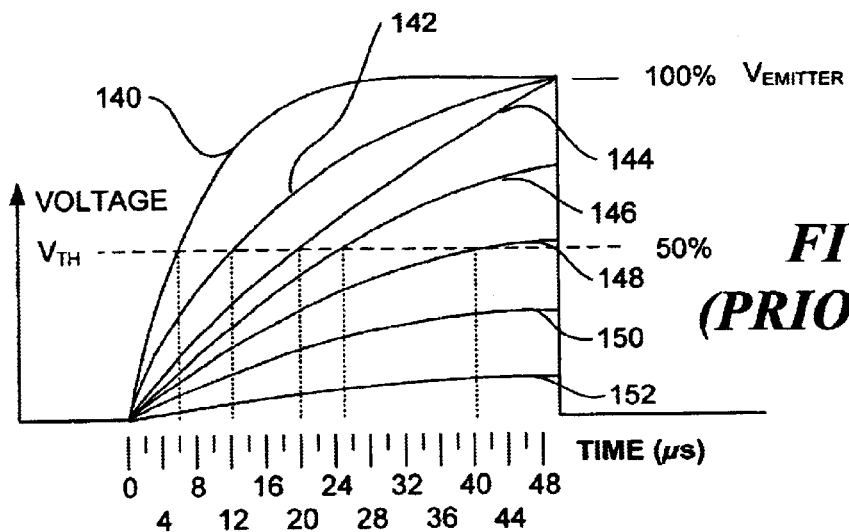
Figure 7:
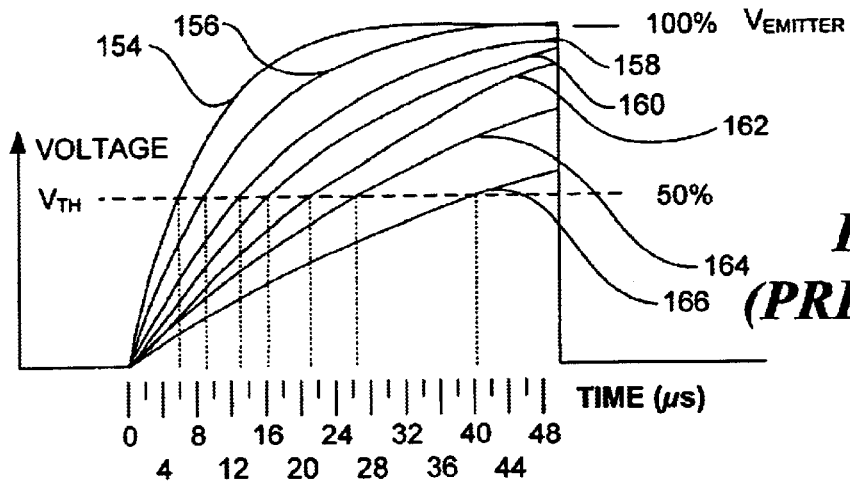
Figures 8A, 8B:
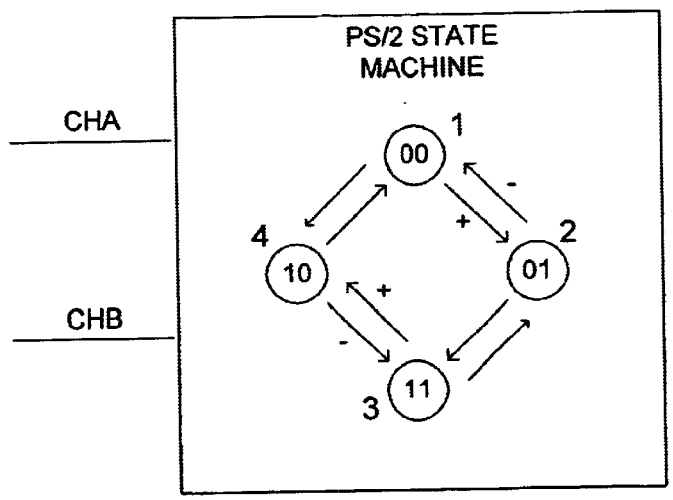
Figure 9:
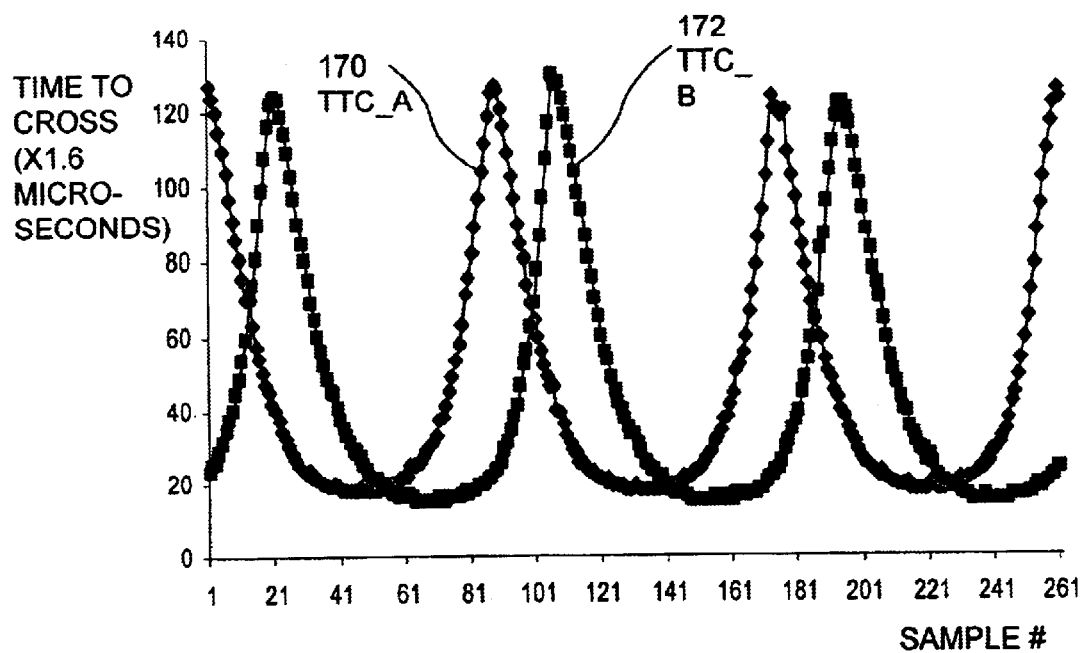
Figure 10:
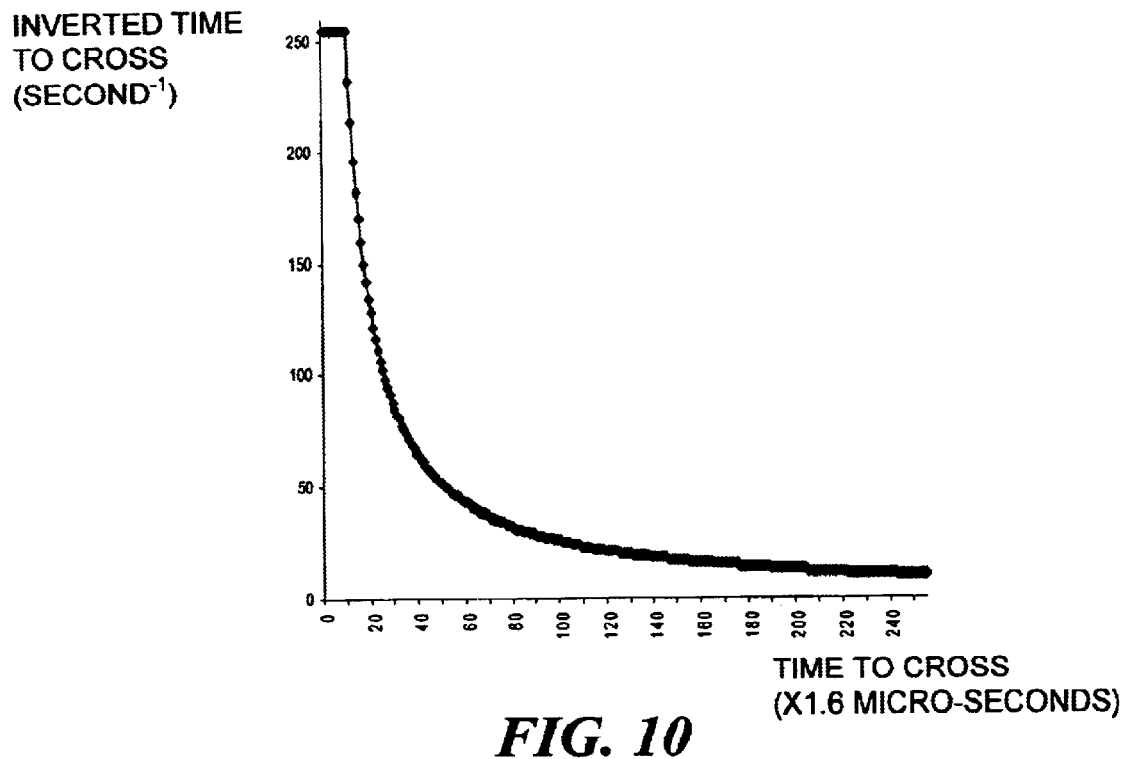
Figure 11:
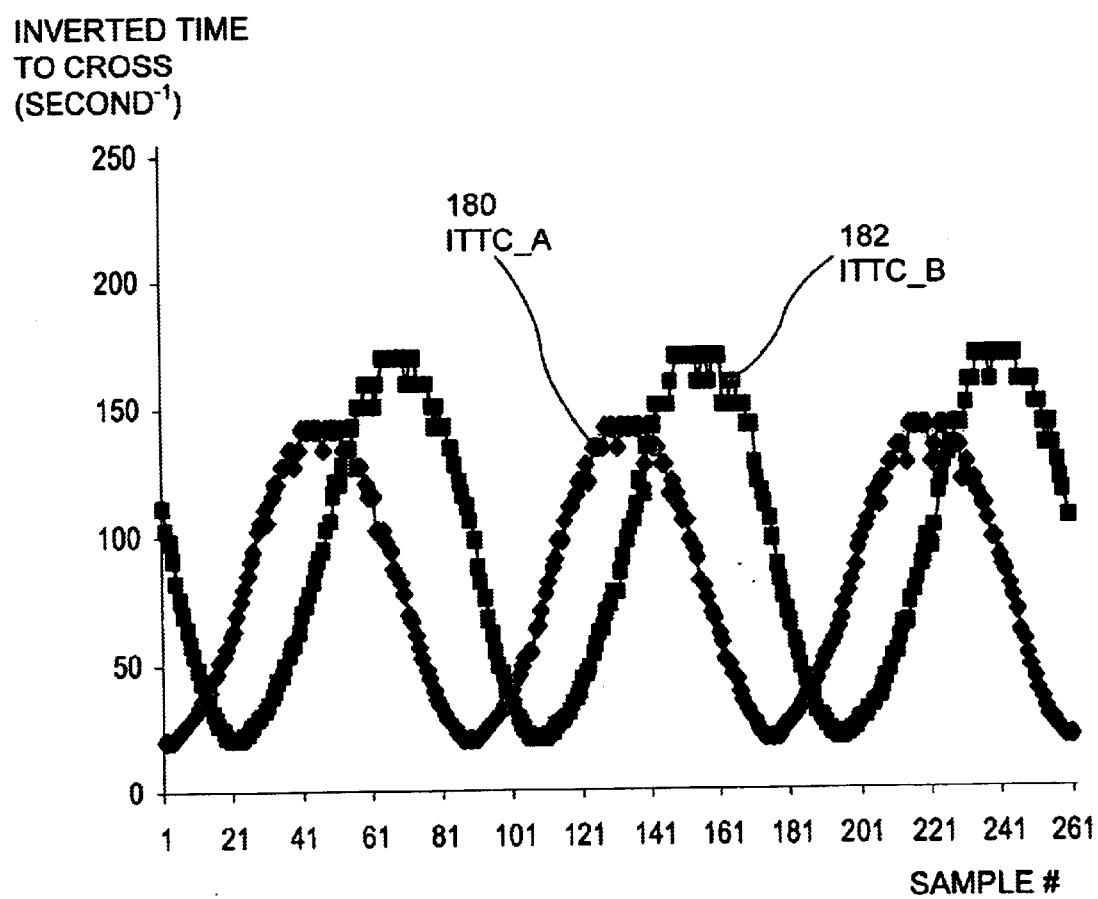
Figure 12:
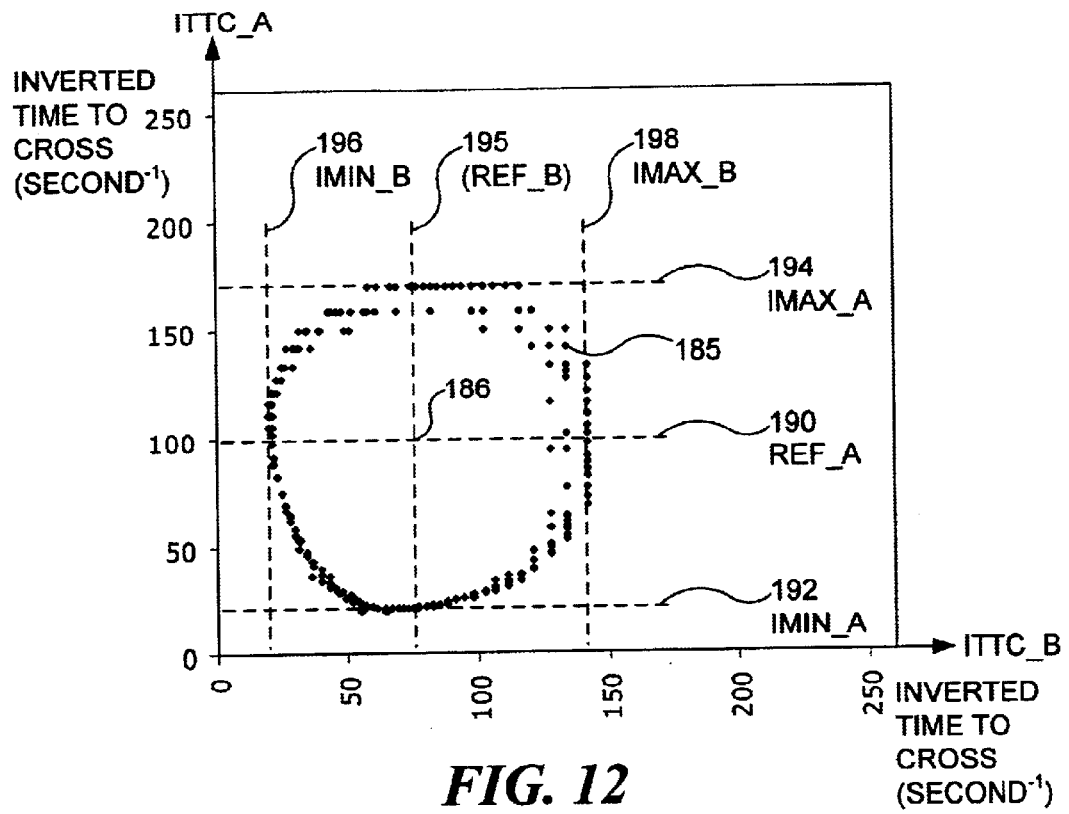
Figure 13:
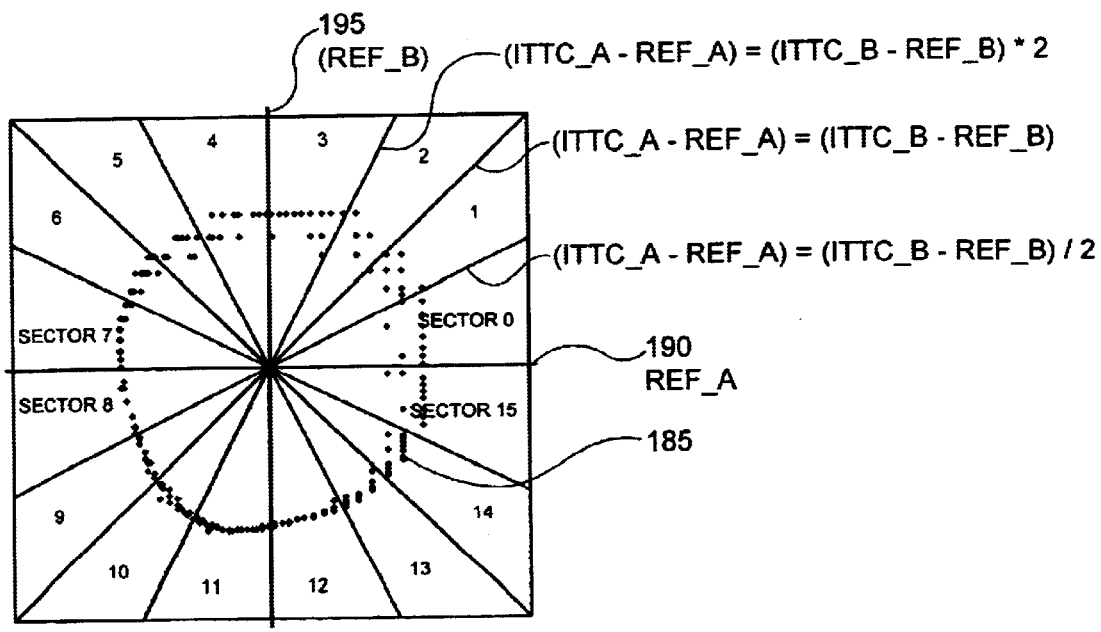

FIG. 3 (prior art) is a block diagram illustrating functional blocks that are used to generate encoder wheel position data, as described in U.S. Pat. No. 6,380,927 B1;

FIG. 4 (prior art) is a signal diagram illustrating output waves of two phototransistors that detect light emitted from an LED and attenuated by the codewheel between the LED and phototransistors;

FIG. 5 (prior art) is a graph of the height of water versus time used in an analogy illustrating the output charge generated by a phototransistor;

FIG. 6 (prior art) is a voltage versus time graph illustrating the output of a given emitter/phototransistor pair at varying levels of blockage by the codewheel;

FIG. 7 (prior art) is a voltage versus time graph illustrating a difference in output between photo-optic sets;

FIG. 8A (prior art) is a state diagram corresponding to a prior art 2X quadrature encoding scheme used with the optical encoder of FIG. 2;

FIG. 8B (prior art) is a prior art transition state table corresponding to the state diagram of FIG. 8A;

FIG. 9 is a plot of "time to cross" samples for two phototransistors when a codewheel is rotated at a constant rate;

FIG. 10 illustrates an inversion function applied to the time to cross data;

FIG. 11 is a plot of inverted time to cross samples for the two phototransistors when the codewheel is rotated at a constant rate;

FIG. 12 is a plot of the inverse time to cross samples plotted against each other;

FIG. 13 is the plot of FIG. 12 divided into sectors; and

Figure 14:
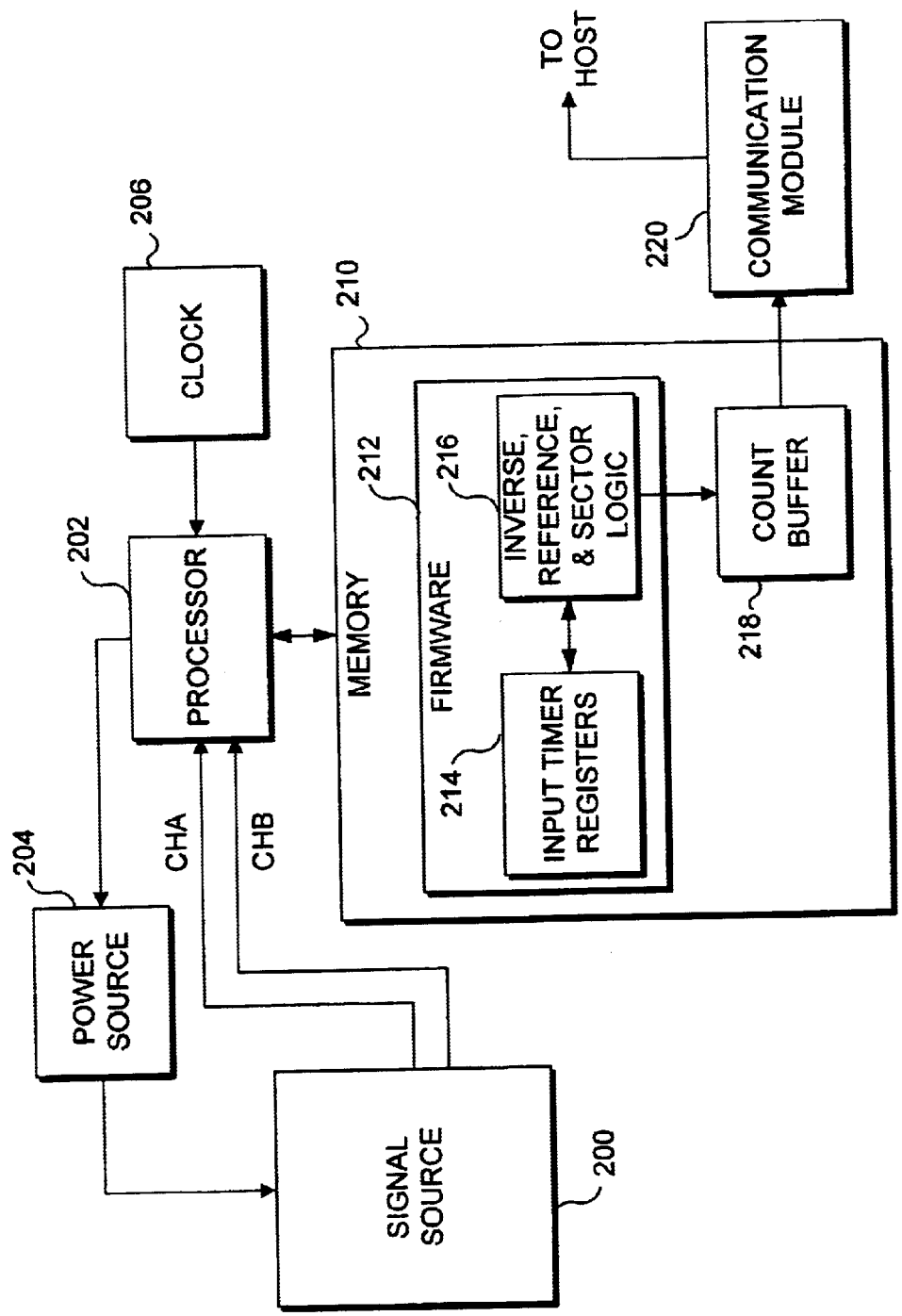

FIG. 14 is a functional block diagram showing components of an exemplary system.

DESCRIPTION OF THE PREFERRED EMBODIMENT

Figure 1:
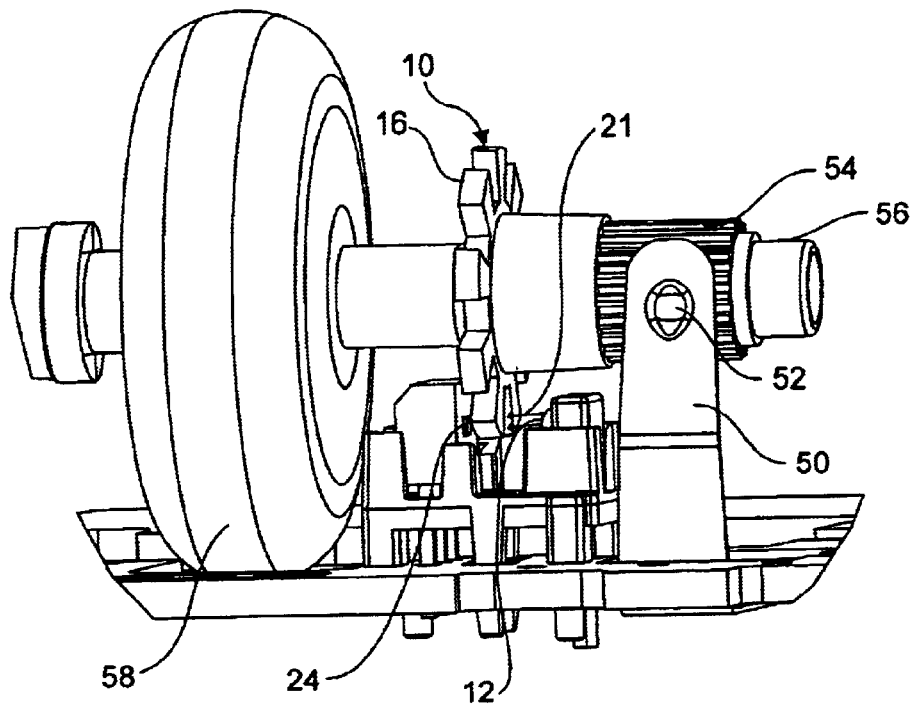
FIG. 1 (prior art) is an isometric view of an assembly comprising the primary components of a prior art detented optical encoder for a rotatable Z-wheel of a computer mouse.

For exemplary purposes, a preferred embodiment of the present invention comprises a Z-wheel encoder system for a computer mouse, such as the mouse shown in the prior art system of FIG. 1. The computer mouse is connected to a personal computer for navigating through a display provided in a graphical user interface operating system and/or in an application program. Although the computer mouse is illustrated with photo optics used to detect motion, those skilled in the art will recognize that the present invention can be implemented with resistive, capacitive, magnetic, and other types of components to detect motion.

State Detection

As indicated above, a prior art 4-state optical encoder system using a one-inch diameter codewheel with 18 teeth equally spaced around the circumference of the codewheel yields 72 counts per revolution. However, observation and analysis of the signals from the prior art 4-state optical encoder reveal a number of properties that can be used to achieve a larger number of states for a movable member device, such as a Z-wheel included on an input device. For example, as can be seen in FIGS. 6 and 7, the initial part of a phototransistor voltage ramp during a light detection cycle is nearly linear. Thus, the voltage ramp rate is directly proportional to the illumination on the phototransistor. Conversely, the time required for the phototransistor voltage to exceed a predefined threshold (e.g., $V_{TH}$) is inversely proportional to the voltage ramp rate. For instance, if the codewheel is positioned such that a slot allows a large amount of LED light to illuminate a phototransistor, the voltage ramp rate is high, and the time required for the voltage to exceed the predefined threshold is short. This time is sometimes referred to herein as the time to cross (TTC).

The TTC can be plotted against the angular rotation of the codewheel. FIG. 9 illustrates a plot of TTC samples for two phototransistors when the codewheel is rotated at a constant rate. An 8-bit timer with a 1.6 µs clock was implemented entirely in firmware to measure the TTC for the phototransistor inputs. The firmware was run on a PIC™ microcontroller from Microchip Technology, Inc. using a 20 MHz clock. With this measurement system, the TTC values can range from 0 to 255. A TTC_A plotline 170 illustrates the TTC for one of the phototransistors. A TTC_B plotline 172 illustrates the TTC for the other phototransistor. The time shift results from the separation between the two phototransistors. Typically, the phototransistors are separated by a distance that produces a 90 degree phase difference in the output signals of the phototransistors.

An interesting perspective of phototransistor output is obtained by inverting the TTC data. FIG. 10 illustrates an inversion function applied to the TTC data. Preferably, the inversion is done using a 256-byte lookup table to eliminate the need for inversion computations. The values of the lookup table are calculated using the following formula:

$$\text{Inverse of TTC} = 255, \quad \text{for } 0 <= TC <= 9$$

$$= \text{Integer}(2550/TC + 0.5), \quad \text{for } 0 <= TC <= 255$$

A value of 2550, instead of 255, was chosen as the numerator to optimize the resolution and dynamic range of the inversion function. A drawback of this choice is that the function clips when TTC is equal to or below 10 counts. However, this situation is unlikely, and can be avoided entirely by adjusting the LED current.

The result of inverting the TTC plotlines is a pair of sinusoidal waveforms, as shown in FIG. 11. An inverse TTC waveform 180 (referred to as ITTC_A) corresponds to TTC_A plotline 170, and an ITTC_B waveform 182 corresponds to TTC_B plotline 172. The general interpretation is that the voltage ramp rate is a sinusoidal function of the angular displacement of the encoder wheel. Accordingly, the voltage ramp rate changes 360 degrees (electrical angle) for each slot-to-slot rotation of the codewheel (mechanical angle). Note that the recovered sinusoidal waveforms have different amplitudes. This result may be caused by a mismatch between the phototransistors and/or a misalignment between the phototransistors and the LED.

These sinusoidal waveforms can be plotted against each other to yield an approximate circle 185, as shown in FIG. 12. Coordinates of a center 186 of approximate circle 185 provide reference values about which an electrical angle can be decoded for each combination of inverse TTC plotlines. The reference values (i.e., the coordinates of center 186) are computed use the formulas below:

IMAX_A=Maximum (ITTC_A)

IMIN_A=Minimum (ITTC_A)

IMAX_B=Maximum (ITTC_B)

IMIN_B=Minimum (ITTC_B)

$$REF\_A = [IMAX\_A + IMIN\_A]/2$$

$$REF\_B = [IMAX\_B + IMIN\_B]/2$$

The maximum and minimum values of ITTC_A and ITTC_B are constantly monitored by the firmware in the present invention, so that the reference values are updated when changes occur to the maximum and minimum values. Knowing these reference values, an electrical angle could be determined for each pair of inverse TTC values (ITTC_A, ITTC_B). The electrical angle for each pair is given by the formula:

$$\text{Electrical angle} = ARCTAN\ [(ITTC\_A - REF\_A)/(ITTC\_B - REF\_B)]$$

Theoretically, this angle could be any angle between zero and 360 degrees, so the resolution of the Z-wheel would be unlimited. However, computing the trigonometric function, ARCTAN, would require a relatively expensive, sophisticated processor to perform floating point computations, or would require excessively large look-up tables. Instead, to maintain fast and simple integer processing on low-cost components, the exemplary embodiment predefines electrical angles for multiple sectors around center 186. In the case of the exemplary Z-wheel embodiment, approximate circle 185 is divided into 16 sectors, as shown in FIG. 13. Sector boundaries could be defined by simply dividing 360 degrees by the number of desired sectors, which would produce equal angles between sectors. However, more efficient computation can be achieved by defining sector boundaries in relation to the reference values. For example, the intermediate sector boundaries needed for the exemplary embodiment can be defined by the following equations.

| | |
|---|---|
| Boundary(0,1): | (ITTC_A − REF_A) = (ITTC_B − REF_B)/2 |
| Boundary(1,2): | (ITTC_A − REF_A) = (ITTC_B − REF_B) |
| Boundary(2,3): | (ITTC_A − REF_A) = (ITTC_B − REF_B) * 2 |

The angle of each sector boundary is not equal to 360/16 = 22.5 degrees. Instead, the angles alternate between 26.56 degrees and 18.44 degrees for odd-numbered and even-numbered sectors, respectively. Moreover, by defining the sector boundaries in this manner, the microprocessor for the Z-wheel need not perform any angular calculations. Instead, the microprocessor can execute simple bit-shift, compare, and jump instructions to determine the sector into which a pair of inverse TTC values (ITTC_A, ITTC_B) falls, thereby determining the position of the codewheel. The following pseudo code illustrates these instructions.

```
If (ITTC_A > REF_A) and (ITTC_B >= REF_B) then
    Quadrant = 0
        Vertical = ITTC_A − REF_A
        Horizontal = ITTC_B − REF_B
        Goto Sector function
Endif
If (ITTC_A >= REF_A) and (ITTC_B <REF_B) then
    Quadrant = 1
        Vertical = REF_B − ITTC_B
        Horizontal = ITTC_A − REF_A
        Goto Sector function
Endif
If (ITTC_A < REF_A) and (ITTC_B <= REF_B) then
    Quadrant = 2
        Vertical = REF_A − ITTC_A
        Horizontal = REF_B − ITTC_B
        Goto Sector function
Endif
If (ITTC_A <= REF_A) and (ITTC_B > REF_B) then
    Quadrant = 3
        Vertical = ITTC_B − REF_B
        Horizontal = REF_A − ITTC_A
        Goto Sector function
Endif Sector Function:
If (Vertical <= Horizontal /2) then Sector = 0
If (Vertical > Horizontal /2) and (Vertical <= Horizontal) then Sector = 1
If (Vertical > Horizontal) and (Horizontal > Vertical /2) then Sector = 2
If (Horizontal < Vertical /2) then Sector = 3
Sector = Quadrant * 4 + Sector
```

As the Z-wheel is rotated, successive sector values are determined as provided above and are used to determine a number of counts within a sample of the Z-wheel encoder system, and to determine the direction of rotation. Specifically, once a sector is decoded (Current_Sector), it is compared with the decoded sector value of the previous sampling cycle (Prev_Sector) to determine the amount and direction of rotation of the encoder wheel. Since the sectors subdivide a circle, there are two possible directions of rotation. The direction that provides the smaller absolute value of sector change (Delta Sector) is selected. For example, if the previous sector is 1 and the current sector is 10, the number of sector change is −7 instead of +9. If the absolute number of sector change is 8, then the current direction of rotation is taken to be the same as the previous direction of rotation. If the current sector is the same as the previous sector, the absolute number of sector changes is 0, and the direction of rotation remains the same as the previous direction of rotation. Holding the same direction of rotation is required for the 1-sector hysteresis algorithm described below. Table 1 illustrates the direction relationships employed in the present invention:

TABLE 1

Rotation Direction Relationships of Sectors

| Current_Sector − Prev_Sector | Direction | Delta_Sector |
|---|---|---|
| −15 | Positive | 1 |
| −14 | Positive | 2 |
| −13 | Positive | 3 |
| −12 | Positive | 4 |
| −11 | Positive | 5 |
| −10 | Positive | 6 |
| −9 | Positive | 7 |
| −8 | Same as Prev_Dir | 8 |
| −7 | Negative | 7 |
| −6 | Negative | 6 |
| −5 | Negative | 5 |
| −4 | Negative | 4 |
| −3 | Negative | 3 |
| −2 | Negative | 2 |
| −1 | Negative | 1 |
| 0 | Same as Prev_Dir | 0 |
| 1 | Positive | 1 |
| 2 | Positive | 2 |
| 3 | Positive | 3 |
| 4 | Positive | 4 |
| 5 | Positive | 5 |
| 6 | Positive | 6 |
| 7 | Positive | 7 |
| 8 | Same as Prev_Dir | 8 |
| 9 | Negative | 7 |
| 10 | Negative | 6 |
| 11 | Negative | 5 |

TABLE 1-continued

Rotation Direction Relationships of Sectors

| Current_Sector – Prev_Sector | Direction | Delta_Sector |
|---|---|---|
| 12 | Negative | 4 |
| 13 | Negative | 3 |
| 14 | Negative | 2 |
| 15 | Negative | 1 |

Because the rate of sampling the Z-wheel encoder system is higher than a standard PS2, USB, or RF packet rate, counts are accumulated in a buffer before being communicated in a mouse message to the host computer. Once received, the operating system or an application program uses the number of counts from the mouse message to determine a scroll distance. Thus, without changing the mechanical or electrical hardware of existing low-cost Z-wheel systems, the above firmware logic achieves a four-fold increase in resolution over the prior art. Specifically, 16 sectors provide 16 states per tooth and slot, multiplied by 18 teeth around the codewheel, resulting in 288 counts per revolution of the Z-wheel. The prior art achieved only 72 counts per revolution, based on using only 4 states per tooth and slot.

As indicated above, the angles of the sectors alternate between 26.56 degrees and 18.44 degrees for odd-numbered and even-numbered sectors, respectively. As indicated by the above listed pseudo code, using equations associated with these unequal angles greatly simplifies the sub-state decoding algorithm. However, the above equations introduce a percentage error for the angles of approximately 18%, since the angles would be equal at 22.5 degrees. To more closely achieve this preferred angle, yet still use simple bit-shift computations, compare, and jump instructions, sector boundaries can be defined with the following slightly more complex equations. Note that the following equations are written in pseudo code and in terms of the vertical and horizontal values.

| | |
|---|---|
| Boundary(0,1): | Vertical = (1/2 − 1/16) * Horizontal |
| Boundary(1,2): | Vertical = Horizontal |
| Boundary(2,3): | Horizontal = (1/2 − 1/16) * Vertical |

The 1/16 fraction in the above equations can be achieved with only minor additional bit shifting and addition in the firmware, as will be apparent to those of ordinary skill in the art. Yet, with these equations, the electrical angles become either 23.63 or 23.37 degrees. Thus, the percentage error is reduced to only about 5%.

Similarly, other fractions can be used to achieve higher resolution for the exemplary encoder system. For example, higher resolution has been achieved with 32 sectors per tooth and slot transition. The intermediate sector boundaries needed for the 32 sectors can be defined by the following equations, which are also written in terms of the vertical and horizontal values.

| | |
|---|---|
| Boundary(0,1): | Vertical = (1/4 − 1/32) * Horizontal |
| Boundary(1,2): | Vertical = (1/2 − 1/16) * Horizontal |
| Boundary(2,3): | Vertical = (1/2 + 1/4 − 1/16 − 1/32) * Horizontal |
| Boundary(3,4): | Vertical = Horizontal |
| Boundary(4,5): | Horizontal = (1/2 + 1/4 − 1/16 − 1/32) * Vertical |
| Boundary(5,6): | Horizontal = (1/2 − 1/16) * Vertical |
| Boundary(6,7): | Horizontal = (1/4 − 1/32) * Vertical |

When Horizontal>Vertical,

The threshold value of Boundary(1,2) can be calculated first with bit shifting and addition.

The threshold value of Boundary(0,1) can be calculated simply by right shifting the previous threshold value by 1 bit.

The threshold value of Boundary(2,3) can be calculated by adding the previous 2 threshold values.

When Vertical>Horizontal, the operations are the same as above, except that the Vertical and Horizontal values are swapped. Thus, by including a few more bit shifting and addition operations in the firmware, substantially higher resolution can be achieved. Those skilled in the art will recognize that other levels of resolution can be achieved by defining the desired number of sectors and adding corresponding sector logic. Conversely, backward compatibility can be maintained by simply skipping the sector function, and using the quadrant decoding logic to divide each tooth-slot transition into 4 states for the lower resolution of 72 counts per revolution.

In general, the above technique can be used to scale the resolution to any desired level of sectors, which define a resolution of the input device as the number of counts that are sent to the host computer. With a higher number of true counts available from the input device, smooth scrolling can be achieved without requiring excessive rotation of the Z-wheel. The host computer can reduce or eliminate any artificial scale factor (e.g., 120), yet still use other factors in a way that maintains a meaningful relationship to a user-friendly setting, such as the number of lines scrolled per detent increment of the Z-wheel (e.g., the default wheel scroll lines setting of 3).

Error Control

As with most devices, the above approach is subject to some electrical and mechanical factors that introduce drift, anomalies, and other errors that may affect the linearity, resolution, tracking speed and other performance characteristics of the encoding system. Table 2 lists some of the factors and their effects.

TABLE 2

Error Inducing Factors

| | Factors | Causes | Effects |
|---|---|---|---|
| 1 | Amplitude mismatch between the 2 | Difference in sensitivity of the phototransistors Non-uniform illumination pattern | Causes XY-plot of ITTC_A and ITTC_B to be elliptical rather than circular, resulting in non linear |

TABLE 2-continued

Error Inducing Factors

| | Factors | Causes | Effects |
|---|---|---|---|
| | phototransistor outputs. | of the LED Mechanical alignment tolerances between the LED, encoder wheel and photo-transistors. | relationship between electrical angle and mechanical rotation. |
| 2 | Phase difference between TA and TB not equal to 90 degrees. | Mechanical alignment tolerances between the LED, encoder wheel and photo-transistors. | Causes XY-plot of ITTC_A and ITTC_B to be elliptical rather than circular, resulting in non linear relationship between electrical angle and mechanical rotation. |
| 3 | Dimensional variation of the teeth and gaps on the encoder wheel. | Encoder wheel molding tolerances. | Causes XY-plot of ITTC_A and ITTC_B to vary throughout entire rotation of encoder wheel, resulting in non linear relationship between electrical angle and mechanical rotation. |
| 4 | Operating environment changes. | Temperature changes could cause the maximum and minimum values of ITTC_A and ITTC_B to drift. | Skews the reference values REF_A and/or REF_B, resulting in non linear relationship between electrical angle and mechanical rotation. |
| 5 | Glitches in time-to-cross measurements. | Electro-static discharge (ESD) event. | Usually causes abnormally large or small time-to-cross values to be measured, which skews reference values REF_A and/or REF_B, resulting in non linear relationship between electrical angle and mechanical rotation. |
| 6 | Inconsistency of LED current between each sampling cycle. | Supply voltage fluctuations. | Causes jitter when the encoder wheel comes to rest at a position where the electrical angle of ITTC_A and ITTC_B is very close to the boundary between 2 sectors. |
| 7 | Aliasing. | Encoder wheel rotated at a speed exceeding the sampling capability of the micro-controller executing the algorithm. | Causes the algorithm to decode the rotation of the encoder wheel in the wrong direction. |
| 8 | Erratic sector decoding during start-up. | When the system is first started up, the maximum and minimum values of ITTC_A and ITTC_B are not known. | The algorithm can only track the rotation correctly after the encoder wheel has been rotated 360 electrical angles (complete tooth-to-tooth mechanical rotation) |

The affects of some of these factors can be controlled in the firmware algorithm to reduce errors. For example, the amplitude mismatch in the phototransistor outputs can be compensated by appropriately scaling the ITTC_A and ITTC_B values, if the micro-controller supports multiplication and signed integer operations. The values of ITTC_A and ITTC_B can be normalized by the following equations:

NITTC_A=(ITTC_A-REF_A)*(IMAX_B-IMIN_B)

NITTC_B=(ITTC_B-REF_B)*(IMAX_A-IMIN_A)

The normalized NITTC_A and NITTC_B values will have the same maximum and minimum values. As such, NITTC_A and NITTC_B will trace a circular path around the origin of the XY plot (0,0), minimizing uneven state distribution caused by mismatched phototransistor output signal amplitudes.

To compensate for the drift in the reference point due to operating environment changes, the maximum and minimum values of ITTC_A and ITTC_B are constantly monitored by the firmware, so that the reference values REF_A and REF_B are updated when changes occur to the maximum and minimum values. Specifically, every set of ITTC_A and ITTC_B sample values are compared against the registers holding the most recent maximum and minimum values. If the sample values exceed the current maximum or minimum values, the registers are updated with the new values and the reference values are recalculated accordingly.

At least two methods are used to minimize the impact of aberrations in the electrical system. First, the value change in the IMAX_A, IMINA, IMAX_B, IMIN_B registers are limited to 5. For example, if the current maximum for ITTC_A is 120, and the next sample came in as 150, this change is most likely the result of an electrical glitch, and the register is only incremented by 5, to 125. Limiting increments of maximum and minimum values will help to reduce the effect of aberrant data.

Second, the maximum and minimum values are shrunk periodically, after every 288 state changes (i.e., one revolution of the Z-wheel). Specifically, the IMIN_A and IMIN_B registers are incremented by 1, and IMAX_A and IMAX_B registers are decremented by 1, after every 288 state changes, until the resulting values reach the initial values. This approach will diminish the effect of electrical glitches and help the system fine tune to changes in the operating environment.

To eliminate jitter when the encoder wheel comes to rest at a position where the electrical angle of ITTC_A and ITTC_B is very close to the boundary between two sectors, a 1-state hysteresis is added to the state decoding algorithm. However, whenever there is a change in scroll direction, the first sector change is not added to the state change count.

As indicated in Table 1, the algorithm is capable of accurately decoding the direction and amount of rotation up to 8 sectors between each sampling cycle. If the encoder wheel is rotated fast enough such that the electrical angle changes more than 8 sectors between two sampling cycles, the decoded direction and amount of rotation will be erroneous. Those skilled in the art will recognize that there is a direct relationship between the maximum speed of rotation of the encoder wheel and the rate at which the time to cross values are measured (i.e., the sampling rate).

As long as the sampling rate is high enough to correctly encode a rotation speed that is higher than it is physically possible to rotate the encoder wheel, aliasing will not occur. For example, using the existing 18-tooth encoder wheel, the required sampling rate to correctly encode a rotational speed of 2000 rotations per minute (RPM) can be calculated by the following equation:

$$\text{Sampling rate} = (RPM \div 60 * 288 \div 8) \text{ samples per second}$$
$$= 1200 \text{ samples per second}$$

When the system has just been initialized and the user has not used the scroll wheel, the maximum and minimum values of ITTC_A and ITTC_B, and thus the reference values REF A and REF B are not yet known. As such, the electrical angle of the initial samples can not be determined until the wheel has been rotated at least through 360 electrical degrees (i.e., a single tooth-to-tooth mechanical rotation). There are at least two methods to overcome this problem.

First, the maximum and minimum ITTC_A and ITTC_B values can be measured over a large population of LED and phototransistor pairs. The statistical values of the maximum and minimum values can be studied and an initial estimate for the REF_A and REF_B values can be selected and hard coded in the firmware that will enable the algorithm to decode the electrical angle reasonably well during the initial start up. As the user continues to use the scroll wheel, the reference values can then be fine tuned as described above to the optimal values.

Alternatively, the maximum and minimum values can be measured for each production unit during the manufacturing process and the reference values can be calculated and stored in some non-volatile memory of the microcontroller. When the user plugs in the unit for the first time, the microcontroller will retrieve the stored reference value for decoding the electrical angle during the initial start up period.

Those skilled in the art will recognize that solutions to address other factors in TABLE 1 are available in the art.

Exemplary System

To provide a better understanding of the above technique and error controls, a functional block diagram of an exemplary system is illustrated in FIG. 14. A signal source 200 produce a Channel A signal and a Channel B signal. For example, as discussed above, a codewheel rotates between an emitter and a detection circuit to produce a Channel A signal and a Channel B signal from two corresponding phototransistors. Those skilled in the art will recognize that signal source 200 may take many other forms. For instance, a ball may rotate the codewheel between the emitter and detection circuit, a slider may change the resistance of two points of a potentiometer, a stylus or finger may be moved along a pressure sensitive pad, an insulator may be passed adjacent to two capacitive detectors, a conductor may be moved to detect a magnetic flux, or many other signal sources may be used. In any case, the signals are communicated to a processor 202. Preferably, processor 202 is a simple microcontroller, such as a CYPRESS™ microcontroller, but is not limited a microcontroller. Processor 202 may instead comprise a hard-wired circuit, an application specific integrated circuit (ASIC), or any other element capable of accomplishing the technique described above. Processor 202 is preferably in communication with a power source 204 to control power to signal source 200. For example, processor 202 may control power to the emitter by clamping and releasing current to produce a rise in illumination detected by the detection circuit. Processor 202 is also in communication with a clock 206, which preferably regulates the operating speed of processor 202 to approximately 20 MHz.

Processor 202 is further in communication with a memory 210. Memory 210 may be included on the same chip as processor 202 or in one or more components that are separate from processor 202. Stored in memory 210 is firmware 212. In a preferred embodiment, firmware 212 compiles into approximately 895 machine words, with 14 bits for each word. Preferably, firmware 212 includes logical input timer registers 214 to avoid the need for additional hardware registers in processor 202. Input timer registers 214 measures the time for signals from signal source 200 to cross the predetermined threshold. Each TTC value can range from 0 to 255. Input timer registers 214 preferably provide an 8-bit timer clocked at a rate between approximately 1 MHz and 2.5 MHz. The TTC values are provided to a logic block 216. Logic block 216 determines the inverse of the TTC values, using a 256-byte lookup table. From the resulting inverse TTC data, logic block 216 determines maximum and minimum values corresponding to each channel, and determines a reference point at the midpoint of each range of maximum and minimum values. Logic block 216 then performs the logic of the above pseudo code to determine the current sector corresponding to the current position represented by the signals from signal source 200: For example, as discussed above, logic block 216 compares the current sector with the previous sector to determine the direction of rotation of the codewheel and the number of sectors since the previous sector (i.e., the count). The count is stored in a count buffer 218, which is included in memory 210. A communication module 220 accesses the count in count buffer 218 to produce and send a message to the host computer. Preferably, communication module 220 is capable of transferring count data at a rate of approximately 20,000 counts per second.

Although the present invention has been described in connection with the preferred form of practicing it, those of ordinary skill in the art will understand that many modifications can be made thereto within the scope of the claims that follow. For example, the invention can be applied to other navigation parameters, including horizontal scrolling, zooming, Z navigation, rotation, volume control, color selection, font scale, slider control, and inter-application navigation. Accordingly, it is not intended that the scope of the invention in any way be limited by the above description, but instead be determined entirely by reference to the claims that follow.

The invention in which an exclusive right is claimed is defined by the following:

1. A method for determining a position of a movable member in an electronic input device, within a predefined resolution, comprising the steps of:
   (a) producing a first signal and a second signal indicative of a position of the movable member, said second signal being offset relative to said first signal;
   (b) determining a first time for a first signal to cross a threshold level, and a second time for the second signal to cross the threshold level;

(c) inverting the first time and the second time to produce a first inverted time and a second inverted time, respectively;

(d) determining an inverse minimum time and an inverse maximum time for the first signal to cross the threshold, and an inverse minimum time and an inverse maximum time for the second signal to cross the threshold;

(e) determining a first reference value as a function of the inverse minimum time and inverse maximum time for the first signal to cross the threshold;

(f) determining a second reference value as a function of the inverse minimum time and inverse maximum time for the second signal to cross the threshold;

(g) determining a sector from among a plurality of predefined sectors as a function of the first inverted time, the second inverted time, the first reference value, and the second reference value, wherein the sector defines the position of the movable member within the predefined resolution.

2. The method of claim 1, wherein the step of determining a sector comprises the steps of:

(a) determining a quadrant from among a plurality of predefined quadrants that divide the predefined resolution, wherein the quadrant is determined as a function of the first inverted time, the second inverted time, the first reference value, and the second reference value;

(b) determining a first virtual coordinate and a second virtual coordinate within the quadrant, wherein the first virtual coordinate and the second virtual coordinate are functions of the first inverted time, the second inverted time, the first reference value, the second reference value, and the quadrant; and (c) determining the sector as a function of the first and the second virtual coordinates within the quadrant.

3. The method of claim 1, wherein the signal corresponds to one of a light level, a voltage, a capacitance, a resistance, and a magnetic flux that varies with the position of the movable member.

4. The method of claim 1, wherein the step of determining the first time and the second time comprises the steps of:

(a) initializing the first signal and the second signal at predefined start levels;

(b) enabling the first signal and the second signal to change toward the threshold level; and (c) measuring the first time required for the first signal to cross the threshold level and the second time required for the second signal to cross the threshold level.

5. The method of claim 2, wherein the step of determining the quadrant comprise the steps of:

(a) determining a first relative magnitude between the first inverted time and the first reference value;

(b) determining a second relative magnitude between the second inverted time and the second reference value; and (c) selecting the quadrant as a function of the first relative magnitude and the second relative magnitude.

6. The method of claim 2, wherein the step of determining the first virtual coordinate and the second virtual coordinate comprises the steps of:

(a) determining a difference between the first inverted time and the first reference value; and (b) determining a difference between the second inverted time and the second reference value.

7. The method of claim 2, wherein the step of determining a sector comprises the steps of:

(a) determining a first relationship between the first virtual coordinate and each of a plurality of sector boundaries;

(b) determining a second relationship between the second virtual coordinate to each of the plurality of sector boundaries; and (c) selecting the sector as a function of the first relationship and the second relationship.

8. The method of claim 1, wherein only integers are used to determine the position of the movable member within the predefined resolution.

9. The method of claim 1, wherein only bit-shift, compare, and jump instructions are used to determine the position of the movable member within the predefined resolution.

10. The method of claim 1, further comprising the steps of:

(a) repeating steps (a)–(g) to determine a current position for the movable member as a function of a current sector determined in step (g);

(b) determining a number of sectors between the sector previously determined and the current sector most recently determined, said number of sectors being indicative of any movement of the movable member between the position previously determined and the current position.

11. The method of claim 10, further comprising at least one of the steps of:

(a) storing the number of sectors in a memory; and (b) communicating the number of sectors to an electronic device to which the electronic input device is coupled.

12. The method of claim 1, further comprising the step of updating one of the first reference value and the second reference value when a change is detected in one of:

(a) the minimum time for the first signal to cross the threshold;

(b) the maximum time for the first signal to cross the threshold;

(c) the minimum time for the second signal to cross the threshold; and (d) the maximum time for the second signal to cross the threshold.

13. A memory medium having machine instructions stored thereon for carrying out the steps of claim 1.

14. An electronic input device comprising:

(a) a movable member;

(b) a first signal source that produces a first signal indicative of a position of the movable member relative to the first signal source, and a second signal source that produces a second signal indicative of the position of the movable member relative to the second signal source, said second signal source being offset from said first signal source; and (c) a controller in communication with the first signal source and the second signal source, to receive the first signal and the second signal, respectively, said controller carrying out a plurality of functions, including:

(i) determining a first time for the first signal to cross a threshold level, and a second time for the second signal to cross the threshold level;

(ii) inverting the first time and the second time to produce a first inverted time and a second inverted time, respectively;

(iii) determining an inverse minimum time and an inverse maximum time for the first signal to cross the threshold, and an inverse minimum time and an inverse maximum time for the second signal to cross the threshold;

(iv) determining a first reference value as a function of the inverse minimum time and inverse maximum time for the first signal to cross the threshold;

(v) determining a second reference value as a function of the inverse minimum time and inverse maximum time for the second signal to cross the threshold; and (vi) determining a sector from among a plurality of predefined sectors as a function of the first inverted time, the second inverted time, the first reference value, and the second reference value, wherein the sector defines the position of the movable member within the predefined resolution.

15. The electronic input device of claim 14, wherein the movable member comprises one of:

(a) a rotatable wheel;

(b) a slidable slider;

(c) a rotatable ball;

(d) a movable stylus; and (e) a movable stick.

16. The electronic input device of claim 14, further comprising a timer in communication with the first signal source and the second signal source, wherein the timer determines a first time for the first signal to cross a threshold level, and determines a second time for the second signal to cross the threshold level.

17. The electronic input device of claim 14, wherein the controller further carries out the functions of:

(a) repeating functions (i)–(vi) to determine a current position for the movable member as a function of a current sector determined in step (vi);

(b) determining a number of sectors between the sector previously determined and the current sector most recently determined, said number of sectors being indicative of any movement of the movable member between the position previously determined and the current position.

18. The electronic input device of claim 17, further comprising at least one of:

(a) a memory for storing the number of sectors; and (b) a communication module for communicating the number of sectors to an electronic device to which the electronic input device is coupled.

19. A method for determining an extent of movement by a movable member that is on an electronic input device, comprising the steps of:

(a) determining a first position of the movable member as a function of an inverse of a first time for a first signal to cross a threshold level relative to an inverse of a second time for a second signal to cross the threshold level, wherein the first signal and the second signal are indicative of the position of the movable member;

(b) detecting a movement of the movable member;

(c) determining a subsequent position of the movable member as a function of an inverse of a third time for the first signal to cross the threshold level relative to an inverse of a fourth time for the second signal to cross the threshold level; and (d) determining the extent of movement of the movable member as a function of the difference between the original position and the subsequent position.

20. The method of claim 19, wherein the step of determining a first position comprises the steps of:

(a) determining an inverse minimum time and an inverse maximum time for the first signal to cross the threshold, and an inverse minimum time and an inverse maximum time for the second signal to cross the threshold level;

(b) determining a first reference value as a function of the inverse minimum time and inverse maximum time for the first signal to cross the threshold level;

(c) determining a second reference value as a function of the inverse minimum time and inverse maximum time for the second signal to cross the threshold level; and (d) determining a sector from among a plurality of predefined sectors as a function of:

(i) the inverse of the first time for the first signal to cross the threshold level;

(ii) the inverse of the second time for the second signal to cross the threshold level;

(iii) the first reference value; and (iv) the second reference value.

* * * * *

UNITED STATES PATENT AND TRADEMARK OFFICE
CERTIFICATE OF CORRECTION

PATENT NO. : 6,900,793 B2  Page 1 of 1
APPLICATION NO. : 10/261477
DATED : May 31, 2005
INVENTOR(S) : Chun B. Goh et al.

It is certified that error appears in the above-identified patent and that said Letters Patent is hereby corrected as shown below:

In Title page, in field (75), under "Inventors" column 1, line 4, delete "Serman" and insert -- Sherman --, therefor.

Signed and Sealed this

Fourteenth Day of December, 2010

David J. Kappos
*Director of the United States Patent and Trademark Office*